(12) United States Patent
Jia et al.

(10) Patent No.: US 10,857,601 B2
(45) Date of Patent: Dec. 8, 2020

(54) SAWTOOTH STRUCTURE WITH REVERSED CUTTING FUNCTION AND ITS DRILL SERIES

(71) Applicant: DALIAN UNIVERSITY OF TECHNOLOGY, Liaoning (CN)

(72) Inventors: Zhenyuan Jia, Liaoning (CN); Fuji Wang, Liaoning (CN); Rao Fu, Liaoning (CN); Yu Bai, Liaoning (CN); Bin Niu, Liaoning (CN); Wei Liu, Liaoning (CN); Jianwei Ma, Liaoning (CN); Chunling He, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 13 days.

(21) Appl. No.: 15/750,677

(22) PCT Filed: Aug. 18, 2016

(86) PCT No.: PCT/CN2016/095919
§ 371 (c)(1),
(2) Date: Feb. 6, 2018

(87) PCT Pub. No.: WO2017/028801
PCT Pub. Date: Feb. 23, 2017

(65) Prior Publication Data
US 2018/0257150 A1    Sep. 13, 2018

(30) Foreign Application Priority Data

Aug. 18, 2015 (CN) .......................... 2015 1 0508097
Mar. 7, 2016 (CN) .......................... 2016 1 0125675
Jun. 14, 2016 (CN) .......................... 2016 1 0412512

(51) Int. Cl.
B23B 51/02 (2006.01)
B23B 51/08 (2006.01)
B23B 51/00 (2006.01)

(52) U.S. Cl.
CPC ............ B23B 51/009 (2013.01); B23B 51/02 (2013.01); B23B 51/08 (2013.01); *B23B 2226/275* (2013.01); *B23B 2251/285* (2013.01)

(58) Field of Classification Search
CPC . B23B 51/009; B23B 51/02; B23B 2226/275; B23B 51/08; B23B 2251/285;
(Continued)

(56) References Cited

U.S. PATENT DOCUMENTS 4,475,850 A * 10/1984 Penoza .................... B23C 5/10
407/53
4,480,949 A * 11/1984 Van De Bogart ........ B23C 5/10
407/54
(Continued)

FOREIGN PATENT DOCUMENTS

CN 201120486 Y 9/2008
CN 101524768 A 9/2009
(Continued)

*Primary Examiner* — Eric A. Gates
*Assistant Examiner* — Paul M Janeski
(74) *Attorney, Agent, or Firm* — Muncy, Geissler, Olds & Lowe, P.C.

(57) ABSTRACT

A kind of sawtooth structure with reversed cutting function and its drill series are presented in this invention. This invention is suitable for drilling low-damage holes on carbon fiber reinforced polymers (CFRP). The sawtooth structure is comprised of sawteeth and grooves located on the cutting edges of drill. And the sawtooth structure is helically arranged with a specific helix angle around the axis of the drill. It can be classified as the left-hand helix sawtooth structure and the right-hand helix sawtooth structure based on the helix angle value. The bottom edges of the left-hand
(Continued)

helix sawtooth structure are the cutting edges, and the rake angles are positive; while the top edges of the right-hand helix sawtooth are the cutting edge with the positive rake angles. The sawtooth structure can be applied to various drilling tools, which proves to be universal. And it can effectively reduce delamination at both hole entrance and hole exit as well as burrs defects. The series of drilling tools include the double point angle drill, the twist drill and the stepped drill all of which have the sawtooth structure on the cutting edges. These series of drilling tools can achieve the CFRP holes with minimum drilling defects. The drilling performance of the tools is improved to a great extent, the tool life is extended and the costs are reduced.

8 Claims, 5 Drawing Sheets

(58) Field of Classification Search
CPC .......... B23B 2251/44; B23B 2251/446; B23B 2251/08; B23B 2251/248; Y10T 408/9097; Y10T 408/909; Y10T 408/906; Y10T 408/375
See application file for complete search history.

(56) References Cited

U.S. PATENT DOCUMENTS

| | | | | | |
|---|---|---|---|---|---|
| 4,831,674 | A | * | 5/1989 | Bergstrom | B23G 1/34 408/222 |
| 4,936,721 | A | * | 6/1990 | Meyer | B23B 51/08 408/224 |
| 4,943,191 | A | * | 7/1990 | Schmitt | B23G 5/184 408/1 R |
| 5,221,163 | A | * | 6/1993 | Nishimura | B23C 5/10 407/53 |
| 5,636,948 | A | * | 6/1997 | Rexius | B23B 51/02 407/54 |
| 5,807,039 | A | * | 9/1998 | Booher | B23B 51/02 408/224 |
| 7,419,339 | B2 | * | 9/2008 | Glimpel | B23G 5/188 409/74 |
| 2012/0207557 | A1 | | 8/2012 | Durfee | |
| 2014/0227034 | A1 | * | 8/2014 | Inglis | B23B 51/08 405/36 |

FOREIGN PATENT DOCUMENTS

| | | |
|---|---|---|
| CN | 104999118 A | 10/2015 |
| CN | 105034076 A | 11/2015 |
| CN | 105598509 A | 5/2016 |

* cited by examiner (Figure1 (a) as an illustration in Abstract)

SAWTOOTH STRUCTURE WITH REVERSED CUTTING FUNCTION AND ITS DRILL SERIES

TECHNICAL FIELD

The invention belongs to the drilling tool technical field in the mechanical machining, and relates to a sawtooth structure with reversed cutting function and its drill series. And the invention is specifically fitted for drilling carbon fiber reinforced polymer composites within one shot to guarantee high quality and high efficiency.

BACKGROUND

The fiber reinforced polymer (FRP) composites generally have excellent mechanical properties designable performance is and they are easy to be manufactured to the net shape. Therefore, the FRP composites are widely used in the manufacturing of structural parts in the aeronautical field and effectively reduce the weight of structural parts and the manufacturing cycle as well as improve reliability. It is especially true for carbon fiber reinforced polymer (CFRP) composites due to their high specific strength and specific stiffness, and the CFRP composites are usually applied for manufacturing the core load-bearing structures. The machining of the CFRP parts is necessary to achieve the assembly among all the CFRP parts and drilling hole—is one of the most heavy-tasked works in the whole process. For example, there are more than three million holes on one single Boeing 747. Because CFRP is comprised of carbon fiber reinforcement and resin matrix, the material is anisotropic and stacked, and the bonding between two adjacent laminates is weak. In drilling, the drill point always generates a relatively large thrust force and at both hole entrance and hole exit of CFRP the materials are under weak support. Therefore, the thrust force can break the outermost laminates and induce delaminations as well as fiber pullouts and burrs. At the same time, the extremely abrasive carbon fiber can cause rapid tool wear and thus dull the cutting edges, which leads to difficulties in cutting off carbon fibers and subsequent burrs at hole entrance and hole exit. In order to overcome the above issues and achieve high quality drilled hole on CFRP parts, some companies proposed the diamond coating on the drill bits; some utilized multiple drilling processes such as "drilling-rough reaming-finish reaming".

The geometrical structures of the drill are the major influencing factor for the drilling quality of CFRP. Therefore, many drills with different and special structures have been developed for drilling CFRP all around the world. Each of the drills has their own benefits and drawbacks. For example, in patent issued by Suzhou Anuo precision machining company (application no.:201310104178.6), the drill bit has two flutes, and the structure forms two primary cutting edges with intersecting the drill axis. The characteristics of the structures are stated as three points, and one point is lower than the other two. Thus the structure can guarantee the strength of the drill bit and centering capability. And the two outer points can effectively cut off carbon fibers with fewer burrs. However, fiber pullouts are easily generated, and tool wear occurs rapidly in drilling laminated materials with low bonding. And severe tool wear can lead to significant quality drop of drilled holes. The Sandvik Company reveals a patent (application no.:201180020931.2) that depicts a twist drill for drilling advanced materials. It can be applied for drilling such as carbon fiber reinforced polymers and glass fiber reinforced polymers. The helix angle is variable within the drill bit, and the initial and final helix angles are fixed. And by combining primary and minor relief angles, the thrust force can be minimized. The specially designed twist drill can reduce delamination to a certain extent, however, the tool life is relatively short thus leading to burrs rapidly.

SUMMARY OF THE INVENTION

This invention aims at solving the technical problem that defects, such as delamination, burrs and cracks, easily generate at the hole exit and entrance in drilling fiber reinforced composite.

The technical solution adopted by the invention is:

The sawtooth structure is constructed by sawteeth 1-1 and grooves 1-2 located on the cutting edges of drill; the sawteeth 1-1 and grooves 1-2 are helically arranged around the drill axis; the sawtooth structure be classified as the left-hand helix sawtooth structure and the right-hand helix sawtooth structure based on the helix angle of the sawtooth structure 1-$\beta$; the sawteeth 1-1 with acute helix angle 1-$\beta$ larger than 60° are categorized as right-hand sawteeth, and their top edges 1-3 perform as cutting edges that are ground into positive rake angles 1-$\gamma_{Ou}$; the sawteeth 1-1 with right angle or obtuse helix angle 1-$\beta$ less than 150° are categorized as left-hand sawteeth, and their bottom edges 1-4 perform as cutting edges that are ground into positive rake angles 1-$\gamma_{Od}$; the sawtooth structure is located on the cutting edges whose diameters are equal to 0.6 to 1 times of drill diameter, and for step drilling structures the sawtooth structure is located at each step minor cutting edges; the length of sawteeth 1-$L_t$ is no larger than the length of drilling margin while maintaining at least 0.8 mm; the width of grooves 1-$W_g$ is not less than the thickness of two CFRP laminates and at the same time maintains at least 0.3 mm; the width of sawteeth 1-$W_t$ is at least 0.5 mm; the depth of grooves 1-$D_t$ is at least 0.8 mm, and the sawteeth at minimum diameter cannot interfere with the drilling core.

One of the drill series consisting of a sawtooth structure with reversed cutting function is an intersecting-sawtooth double point angle drill wherein the right-hand and left-hand sawteeth are located at the cutting edges of the double point angle drill with four flutes; the sawtooth cutting zone 2-E is arranged at the end of four secondary cutting edges 2-2 within the secondary cutting zone 2-B as well as at the front of four minor cutting edges 2-3 within the minor cutting zone 2-C; the sawtooth cutting zone 2-E is constructed by sawtooth structure arranged at separate cutting edges; the profiles of sawteeth 1-1 and grooves 1-2 remain the same within one cutting edge.; the number of sawteeth along one cutting edge is 3-7, and the number is identical within all cutting edges; the helix angles of sawteeth 1-1 and grooves 1-2 are different within two adjacent cutting edges while the helix angles of sawteeth 1-1 and grooves 1-2 are identical within two opposite cutting edges; the helix angle 2-$\beta_R$ of sawteeth 1-1 on one set of cutting edges are right-hand acute angles larger than 60°, and the top edges 1-3 perform as cutting edges which are ground into positive rake angles 1-$\gamma_{Ou}$; the helix angle 2-$\beta_L$ of sawteeth 1-1 on the other set of cutting edges are left-hand right angle or obtuse angles less than 150°, and the bottom edges 1-4 perform as cutting edges which are ground into positive rake angles 1-$\gamma_{Od}$; the above stated right-hand and left-hand sawteeth form the intersecting sawtooth cutting zone 2-E on two adjacent cutting edges.

One of the drill series consisting of a sawtooth structure with reversed cutting function is a right-hand-sawtooth double point angle drill, wherein the right-hand sawteeth are arranged helically on the cutting edges of the drill with four flutes, and the sawtooth cutting zone 3-E is arranged at the front of the four secondary cutting edges at the secondary cutting zone 3-B and the end of the four minor cutting edges at the minor cutting zone 3-C. The sawtooth cutting zone 3-E is constructed by sawtooth structure located at separated cutting edges; the number of sawteeth 1-1 on the secondary cutting edge is 1 to 3 and the number of sawteeth 1-1 on the minor cutting edge is 2 to 4; the helix angle 1-β of all the sawteeth 1-1 is acute angle larger than 60° as well as right-handed, and top edges 1-3 on the sawteeth perform as cutting edges that are ground into positive rake angles 1-$\gamma_{0u}$.

One of the drill series consisting of a sawtooth structure with reversed cutting function is aright-hand-sawtooth twist drill, wherein the right-hand sawteeth are arranged on the minor cutting edges; the point angle 4-α of the drill is 85°-90°, and the length of the chisel edge is 0.1-0.6 mm. The rake angle 4-$\gamma_0$ of the primary cutting edges is ground into fixed value and the rake angle 4-$\gamma_0$ is 15°-20°; the first flank angle 4-$\alpha_1$ on the primary cutting edges 4-1 is 10°-12° and the second flank angle 4-$\alpha_2$ on the primary cutting edges 4-1 is 15°-25°; the area of the second flank face 4-8 is 3 to 5 times larger than the area of the first flank face 4-7; the helix angle of the flutes is 30°-34°; the sawtooth cutting zone 4-D is located at the minor cutting edges 4-2 within the minor cutting zone 4-B; the number of sawteeth 1-1 along every minor cutting edge 4-2 is 3-5 and the number is identical among all the minor cutting edges 4-2 as well; the distance 4-d between the sawteeth closest to the drill bit and the primary cutting zone 4-A is 1-1.5 mm; the sawteeth 1-1 and the grooves 1-2 are helically arranged around the drill axis 4-4 and the helix angle of the sawtooth structure 1-β is acute angle larger than 60'; the top edges 1-3 of the sawteeth perform as cutting edges that are ground into positive rake angles 1-$\gamma_{0u}$.

One of the drill series consisting of a sawtooth structure with reversed cutting function is a right-hand-sawtooth wherein the right-hand sawteeth are arranged on each step minor cutting edges of the step drill; the stated step cutting zone 5-A is constructed by n levels of step structures, where n≥2; each step structure is comprised of a primary step cutting zone and a minor step cutting zone; the stated sawtooth cutting zone 5-D is located on the step cutting zone 5-A and the sawtooth cutting zone 5-D is constructed by n levels of sawtooth structures; n levels of sawtooth structures are arranged in the direction from the drill point to the clamping zones-C; Level j sawtooth structures is located at the corresponding minor cutting zone of Level j step structures, where 1≤j≤n.

The nominal diameter difference between Level j and Level j−1 step structures is 20% to 40% of the nominal diameter of Level j step structure, where 2≤j≤n; at least two sawteeth are distributed along the axial direction on the step minor cutting edges of Level j step structure, where j>2; the point angle of Level j step structure is set at 80°-100°, where j=1; the point angle of Level j step structure is set at 60°-80° and the point angle of Level j step structure is smaller than that of Level j−1 step structure, where j≥2; the rake angle of primary cutting edges of each step structure is ground into a fixed value; the margin length of each minor cutting edge is 0.5-1.5 mm; the margin on each minor cutting edge is ground into an inverted L-shape structure 5-4.

The number of sawteeth within the sawtooth cutting zone 5-D of each step structure is 2-4; the axial distance between the sawtooth on each step structure which is the closest to the drill point and the end of the corresponding primary cutting edge is 1-1.5 mm; the ratio between the widths of the grooves on Level j−1 and on Level j−1 is 0.6-0.8, where 1<j≤n; the ratio between the widths of sawteeth on Level j−1 and on Level j is 0.5-0.7; the width of the sawtooth on Level 1 is at least 0.5 mm, and the width of the groove is at least 0.3 mm; the sawteeth 1-1 and the grooves 1-2 are helically arranged around the drill axis 5-5, and the helix angle of the sawteeth is an acute angle and larger than 60°. The bottom edges 1-4 of the sawteeth are the cutting edges, and the rake angle of the edges is ground into the positive angle 1-$\gamma_{0u}$.

The effects and benefits of the invention are as follows: the sawtooth structure with reverse cutting function and its drill series, wherein the sawtooth structure is helically arranged with a specific helix angle around the axis of the drill. In drilling fiber reinforced composites, the sawtooth structure has the re-cutting function at the hole entrance and the reversed cutting function at the hole exit in the direction opposite to the feeding direction. The sawtooth structure can be applied to various drilling tools, which proves to be universal. The drill series with the sawtooth structure can make the uncut materials rebound into the sawtooth structure at the exit and entrance in different working conditions. The uncut materials, which rebound into the sawtooth structure, will be cut off by the sawtooth structure in the downward drilling process, thereby the burrs and further delamination will be suppressed at the exit and entrance, and the cutting ability of the drill is improved.

FIGURE LEGENDS

FIG. 1 (b) is the side view of a right-hand-sawtooth double point angle drill consisting of a sawtooth structure with reversed cutting function.

FIG. 3 (b) illustrates the enlarged local view of the left-hand sawtooth structure within the sawtooth cutting zone 2-E in FIG. 2

FIG. 9 (b) illustrates the cutting action of the left-hand sawtooth structure at drill exit.

FIG. 10 (b) illustrates the drill-exit quality of CFRP drilled by Drill #1.

Figure 1:
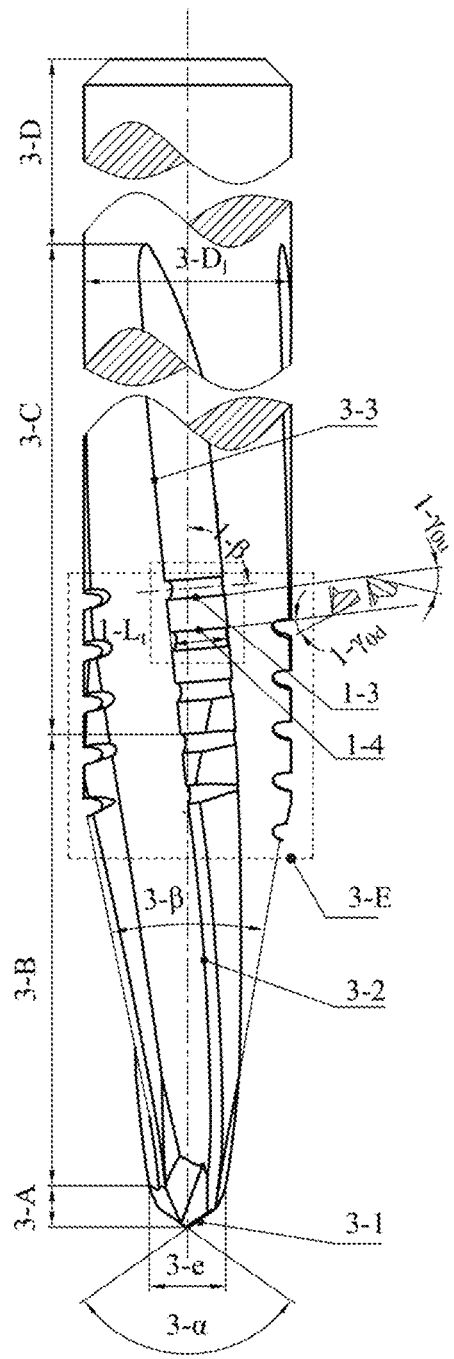
FIG. 1 (a) is the front view of a right-hand-sawtooth double point angle drill consisting of a sawtooth structure with reversed cutting function.
Figure 1:
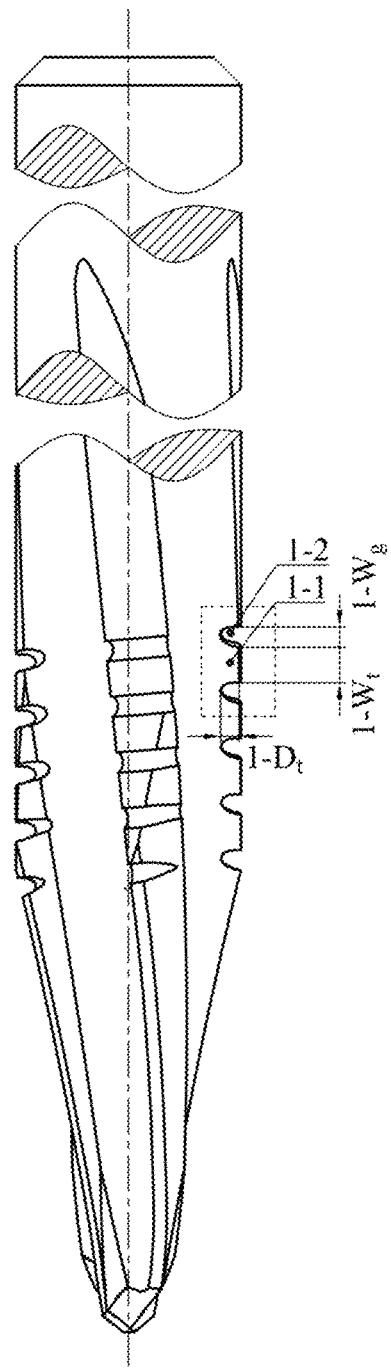

SYMBOL DESCRIPTIONS IN FIGURES 1-1 sawteeth, 1-2 grooves, 1-3 the top edges of the sawteeth, 1-4 the bottom edges of the sawteeth, 1-β the helix angle of the sawtooth structure, 1-$W_t$ the width of sawteeth, 1-$W_g$ the width of grooves, 1-$D_1$ the depth of grooves, 1-$L_t$ the length of sawtooth cutting edges, 1-$\gamma_{Ou}$ the top rake angle, 1-$\gamma_{Od}$ the bottom rake angle;

2-A the primary cutting zone, 2-B the secondary cutting zone, 2-C the minor cutting zone, 2-D the clamping zone, 2-E the sawtooth cutting zone, 2-1 the primary cutting edge, 2-2 the secondary cutting edge, 2-3 the minor cutting edge, 2-4 the helical line of the sawteeth, 2-α the first point angle, 2-β the second point angle, 2-$D_1$ the nominal diameter of the drill, 2-$β_L$ the helix angle of the left-hand sawtooth structure, 2-$β_R$ the helix angle of the right-hand sawtooth structure;

3-A the primary cutting zone, 3-B the secondary cutting zone, 3-C the minor cutting zone, 3-D the clamping zone, 3-E the sawtooth cutting zone, 3-1 the primary cutting edge, 3-2 the secondary cutting edge, 3-3 the minor cutting edge, 3-α the first point angle, 3-β the second point angle, 3-$D_1$ the nominal diameter of the drill, 3-$e$ the maximum width of the two primary cutting edges;

4-A the primary cutting zone, 4-B the minor cutting zone, 4-C the clamping zone, 4-D the sawtooth cutting zone, 4-1 the primary cutting edge, 4-2 the minor cutting edge, 4-3 the end of the minor cutting edge, 4-4 the drill axis, 4-5 the axis of the sawtooth, 4-6 the chisel edge, 4-7 the first flank face, 4-8 the second flank face, 4-α the point angle, 4-$\gamma_0$ the rake angle of the primary cutting edge, 4-$α_1$ the first flank angle, 4-$α_2$ the second flank angle, 4-$d$ the distance between the sawteeth closest to the drill bit and the end of primary cutting zone;

5-A the step cutting zone, 5-B the minor cutting zone, 5-C the clamping zone, 5-D the sawtooth cutting zone, 5-I the first step structure, 5-II the second step structure, 5-$i$ the first sawtooth structure, 5-$ii$ the second sawtooth structure, 5-1 the primary cutting edge, 5-2 the secondary cutting edge, 5-3 the minor cutting edge, 5-4 inverted L-shape structure, 5-5 the drill axis, 5-6 the axis of the sawtooth, 5-$α_1$ the point angle of the first step structure, 5-$α_2$ the point angle of the second stepped structure, 5-$a$ the axial length of the first stepped structure, 5-$b$ the axial length of the second stepped structure, 5-$c$ the margin width of the minor cutting edge, 5-$D_1$ the nominal diameter of the first step structure, 5-$D_2$ the nominal diameter of the second step structure.

F burrs of CFRP workpiece, En entrance of CFRP hole, Ex exit of CFRP hole

DETAILED DESCRIPTION

Preferred Embodiments

Figure 9:
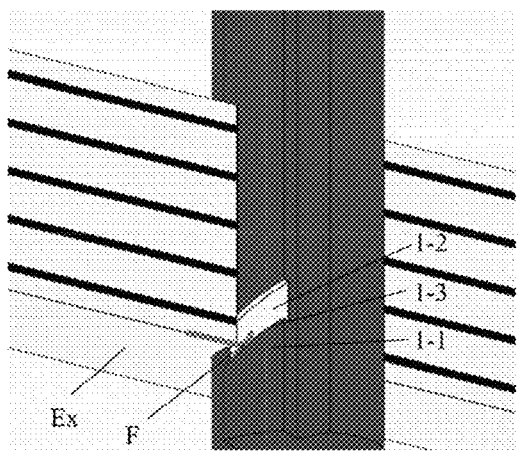
FIG. 9 (a) illustrates the cutting action of the right-hand sawtooth structure at drill entrance.
Figure 9:
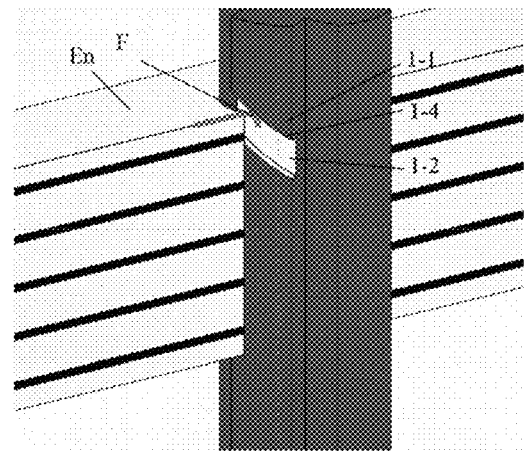

FIG. 9 is the schematic diagram of the sawtooth structure protected by claim 1. It can be seen that the burrs of CFRP workpiece F at the exit and entrance will rebound into grooves 1-2 in drilling, as shown in FIG. 9(a) and FIG. 9(b). Under the condition that the rotating speed is much higher than the feed rate, the helix angle 1-β of the right-hand sawtooth structure is an acute angle that is bigger than 60° at the exit. The top edge 1-3 has a movement relative to the exit of CFRP hole Ex, which forms the scissor-like structure and reversely shears burr of CFRP workpiece F. At the entrance, the helix angle 1-β of the left-hand sawtooth structure is an obtuse angle that is smaller than 150°. The bottom edge 1-4 has a movement relative to the entrance of CFRP hole En, which also forms the scissor-like structure and reversely shears burrs of CFRP workpiece F.

Embodiment 1

Figure 2:
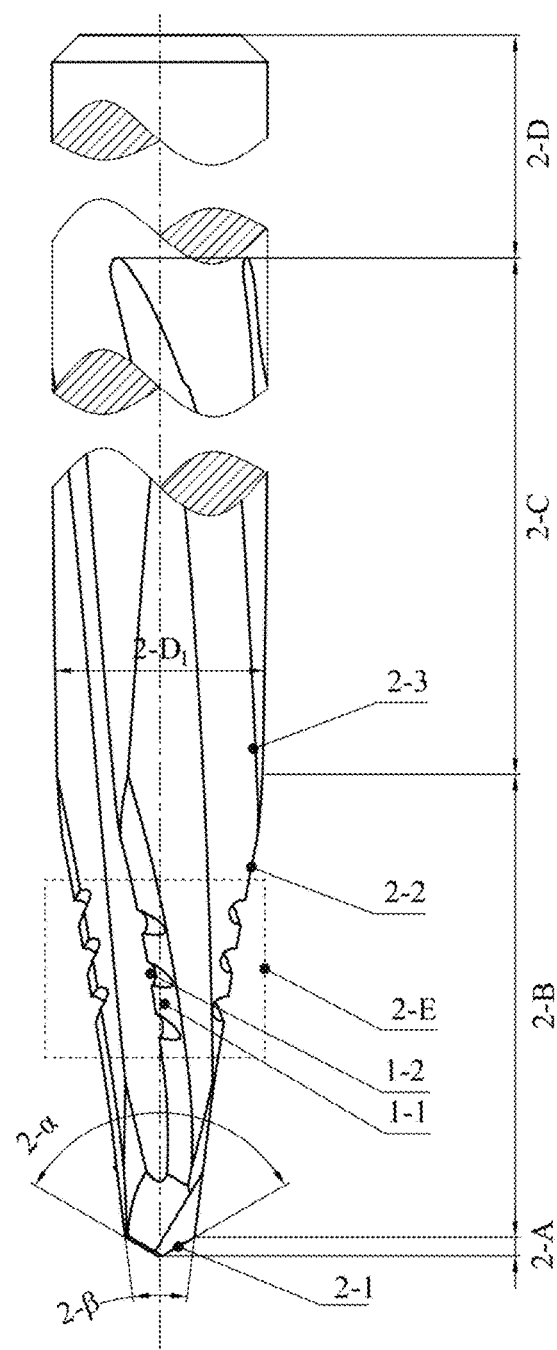
FIG. 2 is the front view of an intersecting-sawtooth double point angle drill consisting of a sawtooth structure with reversed cutting function.
Figure 3:
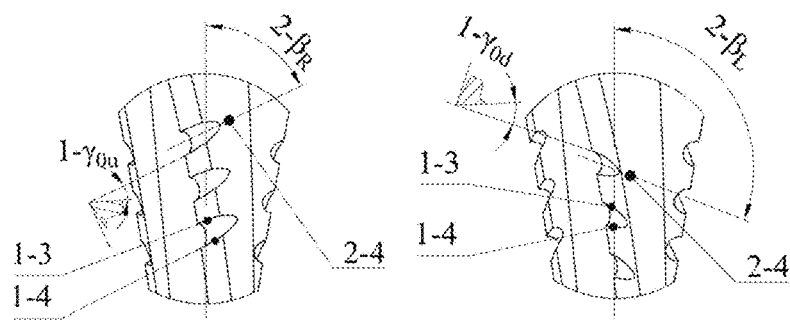
FIG. 3 (a) illustrates the enlarged local view of the right-hand sawtooth structure within the sawtooth cutting zone 2-E in FIG. 2

FIG. 2 shows an intersecting-sawtooth double point angle drill of claim 2. The drill can be divided into five zones: the primary cutting zone 2-A formed by the envelope curves of primary cutting edges 2-1, the secondary cutting zone 2-B formed by the envelope curves of secondary cutting edges 2-2, the left-hand minor cutting zone 2-C whose envelope curves are final hole, the clamping zone 2-D and the sawtooth cutting zone 2-E. Among them, the primary cutting zone 2-A has two primary cutting edges 2-1, and the first point angle 2-α is obtuse, which leads to the high rigidity of the primary cutting edge and preferable centering effect to ensure the drilling smoothly. The implementation adopts 2-α=118°; the secondary cutting zone 2-B has four secondary cutting edges 2-2, and the second point angle 2-β is acute, which results in the sharp secondary cutting edge 2-2, low thrust force and delamination. The minor cutting edge 2-3 adopts low left-hand helix angle to decrease thrust force and realize reaming with a large rake angle. In FIG. 2, the sawtooth cutting zone 2-E distributes in four secondary cutting edges 2-2 of the secondary cutting zone 2-B; the sawtooth cutting zone 2-E consists of the sawtooth structure that distributes in each cutting edges; the sawteeth 1-1 and grooves 1-2 of the sawtooth structure have identical profile structure in the same cutting edge; there are three sawteeth 1-1 in cutting edge, and the number of them is uniform in each cutting edges. As shown in FIG. 2, FIG. 3(a) and FIG. 3(b), the helix angle of sawteeth 1-1 and grooves 1-2 are different in adjacent cutting edges, while the helix angle of sawteeth 1-1 is identical in opposite cutting edges; among them, the sawteeth 1-1 has the helix angle 2-$β_R$ of 75° in a pair of cutting edges that are right-hand sawteeth. The top edges 1-3 of them act as cutting edge and are ground into positive rake angle 1-$\gamma_{Ou}$, which equals to 20°; in addition, the sawteeth 1-1 have the helix angle 2-$β_L$ of 110° in another pair of cutting edges that are left-hand sawteeth. The bottom edge 1-4 of them act as cutting edges and are ground into positive rake angle 1-$\gamma_{Od}$, which equals to 20°; the above right-hand sawteeth and left-hand sawteeth form the sawtooth cutting zone 2-E with crossed helix direction in adjacent cutting edges. The width of grooves 1-2 is 1.5 mm and the width of sawteeth is 1.5 times higher than that of grooves in the same secondary cutting edge. It can preferably guarantee the rigidity and avoid destruction for sawteeth in drilling.

An intersecting-sawtooth double point angle drill is a special structure designed for drilling of fiber reinforced composite material. It can decrease the delamination, remove burrs gradually, avoid cracks effectively at the drill entrance and exit, and form a high quality final hole in one-shot drilling operation.

Embodiment 2

FIGS. 1(a) and (b) shows a right-hand-sawtooth double point angle drill of claim 3. The drill can be divided into four zones: the primary cutting zone 3-A, the secondary cutting zone 3-B, the minor cutting zone 3-C, and clamping zone 3-D. In addition, the sawtooth cutting zone 3-E locates in the joint of the secondary cutting zone 3-B and the minor cutting zone 3-C which consists of several sawteeth 1-1 and grooves 1-2. The sawtooth cutting zone 3-E is formed by the sawtooth structure distributed in each cutting edge. There are one sawtooth 1-1 in the secondary cutting edge and four sawteeth 1-1 in the minor cutting edge. The sawteeth 1-1 in all cutting edges is right-hand. The top edges 1-3 act as cutting edges and are ground into positive rake angle 1-$\gamma_{Ou}$ that equals to 20°.

Drilling can be divided into five stages: The first stage is crushing. The chisel edge contacts and crushes the workpiece. Because of the crushing effect of it, thrust force increases rapidly; the second stage is crushing and drilling. The primary cutting edge 3-1 drills into the workpiece and begins to remove material. So thrust force increase to a small extent; the third stage is drilling. The chisel edge arrives at the bottom of workpiece, and thrust force decreases suddenly after chisel edge leaving workpiece; the fourth stage is drilling and reaming. The material is drilled by the secondary cutting edge 3-2 completely and thrust force fluctuate slowly; the fifth stage is removing burrs and reaming. The secondary cutting edge 3-2 starts to drill out of the material, the sawtooth structure begins to remove burrs, minor cutting edge 3-3 reams the hole, so thrust force decrease further.

The minor cutting edge 3-3 adopts left-hand thread and low helix angle. The low helix angle is beneficial for eliminating chip, realizing reaming and decreasing hole wall roughness. The drill has a clockwise rotation from the top view in drilling and realize cutting rightward. The design of left-hand cutting edge increases the actual working rake angle of rightward cutting edge, and a large rake angle is beneficial to drill CFRP.

In FIGS. 1(a) and (b), the nominal diameter of the drill 3-$D_1$ is 8 mm, and the maximum width of the two primary cutting edges 3-e is one-third of it. The primary cutting zone consists of two-stage cutting edges, the primary cutting edge 3-1 and the secondary cutting edge 3-2. The first point angle 3-$\beta$ (formed by two primary cutting edges 3-1 and the second point angle 3-$\beta$ formed by two secondary cutting edges 3-2 are different, and they develop the two-point angle structure. The first point angle 3-$\alpha$ adopts 90°, while the second point angle 3-$\beta$ adopts 10°. The length of the chisel edge need control and is shorter than drilling metal. It adopts 0.22 mm in this implementation. The number of sawteeth 1-1 is one in the secondary cutting edge 3-2, while it is four in the minor cutting edge 3-3. The width of grooves 1-$W_g$ is 0.8 mm, the depth of grooves 1-$D_t$ is 1.2 mm, and the width of the sawteeth 1-$W_t$ is 0.8 mm.

Embodiment 3

Figure 4:
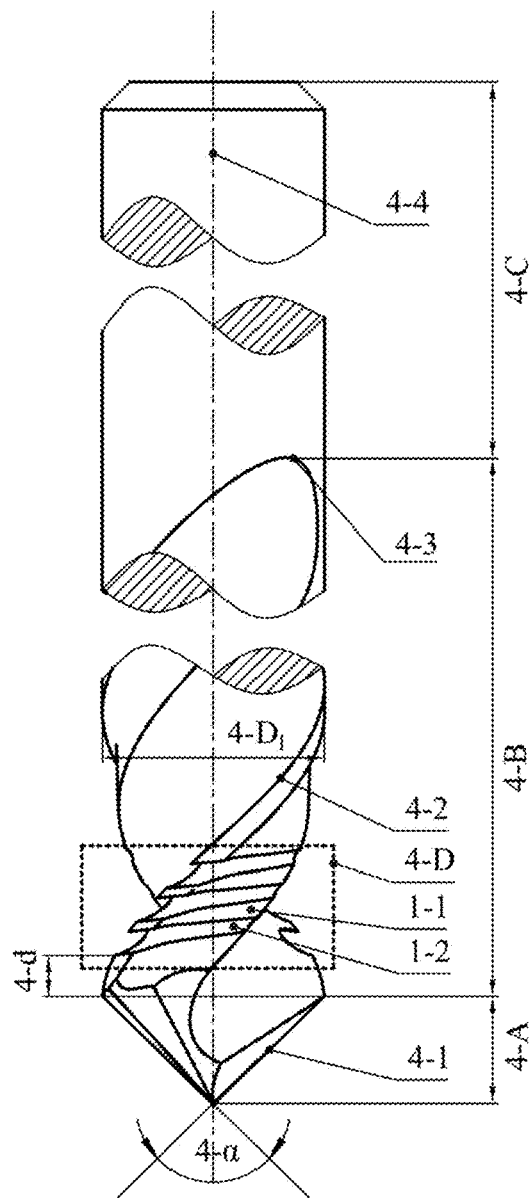
FIG. 4 is the front view of a twist drill consisting of a sawtooth structure with reversed cutting function.
Figure 5:
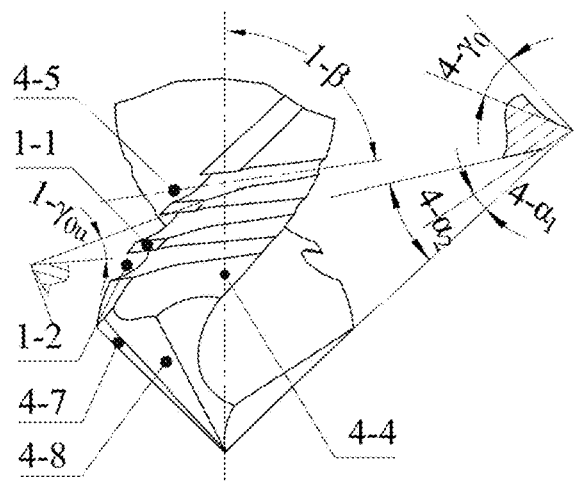
FIG. 5 illustrates the enlarged local view of the primary cutting zone 4-A and the sawtooth cutting zone 4-D in FIG. 4.
Figure 6:
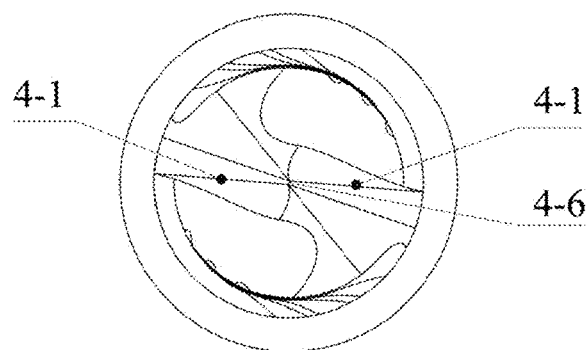
FIG. 6 is the bottom view of a twist drill consisting of a sawtooth structure with reversed cutting function.

FIGS. 4, 5 and 6 show a right-hand-sawtooth twist drill of claim 4. It can be divided into four zones: the primary cutting zone 4-A formed by the outline of the primary cutting edge 4-1, the minor cutting zone 4-B formed by the outline of the primary cutting edge 4-1 terminal and minor cutting edge 4-2, the clamping zone 4-C and the sawtooth cutting zone 4-D. Two primary cutting edges 4-1 develop low point angle 4-$\alpha$, which is beneficial to decrease thrust force and delamination; the minor cutting edge 4-2 is designed with sawtooth structure, which realizes the rebounding into the sawtooth structure and cutting off for generating burrs in drilling. It can eliminate the burrs effectively at the exit and entrance, and decrease the cracks in the final hole; the minor cutting edge 4-2 adopts right-hand structure, and it contributes to removing burrs; each of the primary cutting edges 4-1 have two flank surfaces. It will decrease the friction between drill and workpiece, cutting heat and drill wear. Eventually, the workpiece quality is improved; the changing diameter structure is used to reduce the vibration of entrance in the final molding stage, and enhance the hole diameter precision and entrance quality.

The nominal diameter of the drill 4-$D_1$ is 8 mm, and the drill has two primary cutting edges with two flank faces respectively. The rake angle of primary cutting edge is 20°, the first flank angle 4-$\alpha_1$ is 12°, and the second flank angle 4-$\alpha_2$ is 25°. The area of second flank face 4-8 is six times bigger than that of the first flank face 4-7. The point angle 4-$\alpha$ is 90°, and the helix angle of minor cutting edge 4-2 is 34°.

As shown in FIG. 6, chisel edge 4-6 is formed by grinding the primary cutting edges, and the chisel edge length needs control. It should be smaller than the general metal drilling because smaller chisel edge contributes to reducing delamination. In addition, too small chisel edge easily leads to dropping tool life. In this implementation, the length of the chisel edge 4-6 is 0.6 mm. The sawtooth cutting zone 4-D is located in the minor cutting edge near drill bit of the minor cutting zone 4-B, and consists of several sawteeth 1-1. The outline structure of sawteeth 1-1 is identical in the same minor cutting edge 4-2, which is oval; the number of sawtooth 1-1 is same in each of the minor cutting edges 4-2, which is three, and the axial location is also same. The distance between the sawteeth closest to the drill bit and the end of the primary cutting zone 4-d is 1.5 mm. The sawtooth width is 1 mm for sawteeth 1-1 located in the same minor cutting edge 4-2, and the width of the groove is 1 mm. The helix angle of the sawtooth structure 1-$\beta$ between sawtooth axis 4-5 and drill axis 4-4 is 85°, and the sawtooth has a spiral distribution along the drill axis. The top edges of sawteeth are ground into positive rake angle 1-$\gamma_{Ou}$, which equal to 20°, as shown in FIG. 5.

Figure 10:
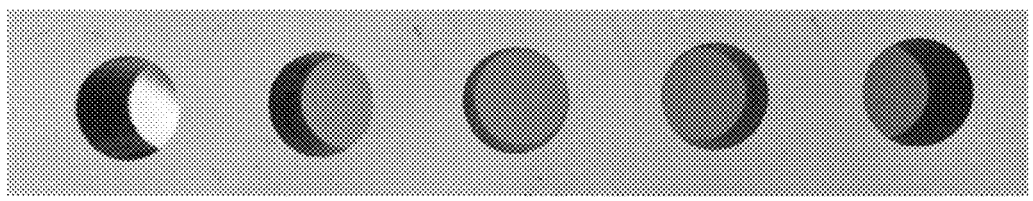
FIG. 10 (a) illustrates the drill-entrance quality of CFRP drilled by Drill #1.
Figure 10:
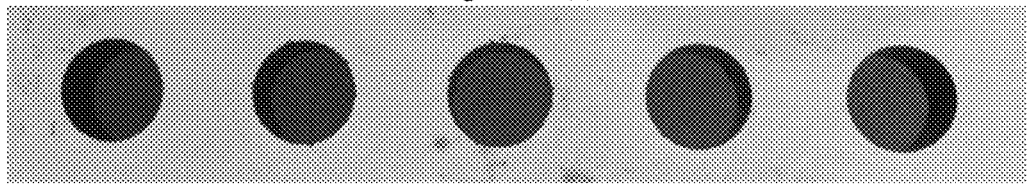

Drilling parameters of 3000 rpm in spindle speed and 150 mm/min in feed rate are adopted in the drilling experiments for multi-directional CFRP composite with a thickness of 9 mm, and all drilling operations are performed under dry condition. The inventive and purchased drills are named as Drill #1 and Drill #2 respectively. After the drilling process, the quality of the entrance surface and exit surface is observed. The hole quality of the entrance surface and exit surface are shown in FIGS. 10(a) and (b) respectively. The detailed description of the experimental results is as follows:

(1) Hole Exit Quality

Drill #2 has tiny delamination at the exit during drilling the first hole, and the delamination starts to aggravate with the increasing of hole number. However, Drill #1 doesn't have delamination at the exit during drilling the first hole, and its quality is still excellent until the fifth hole.

(2) Hole Entrance Quality

Drill #2 has tiny delamination during drilling the first hole, and the delamination starts to aggravate with the increasing of hole number. However, Drill #1 doesn't have delamination at the entrance during drilling the first hole, and its quality is still excellent until the fifth hole.

(3) Tool Life

The delamination begins to extend in the second hole, and becomes more severe in the fourth hole for Drill #2. Its tool life is very short. In addition, the fifth hole's quality is still excellent for Drill #1, and therefore, Drill #1 has better tool life.

Embodiment 4

Figure 7:
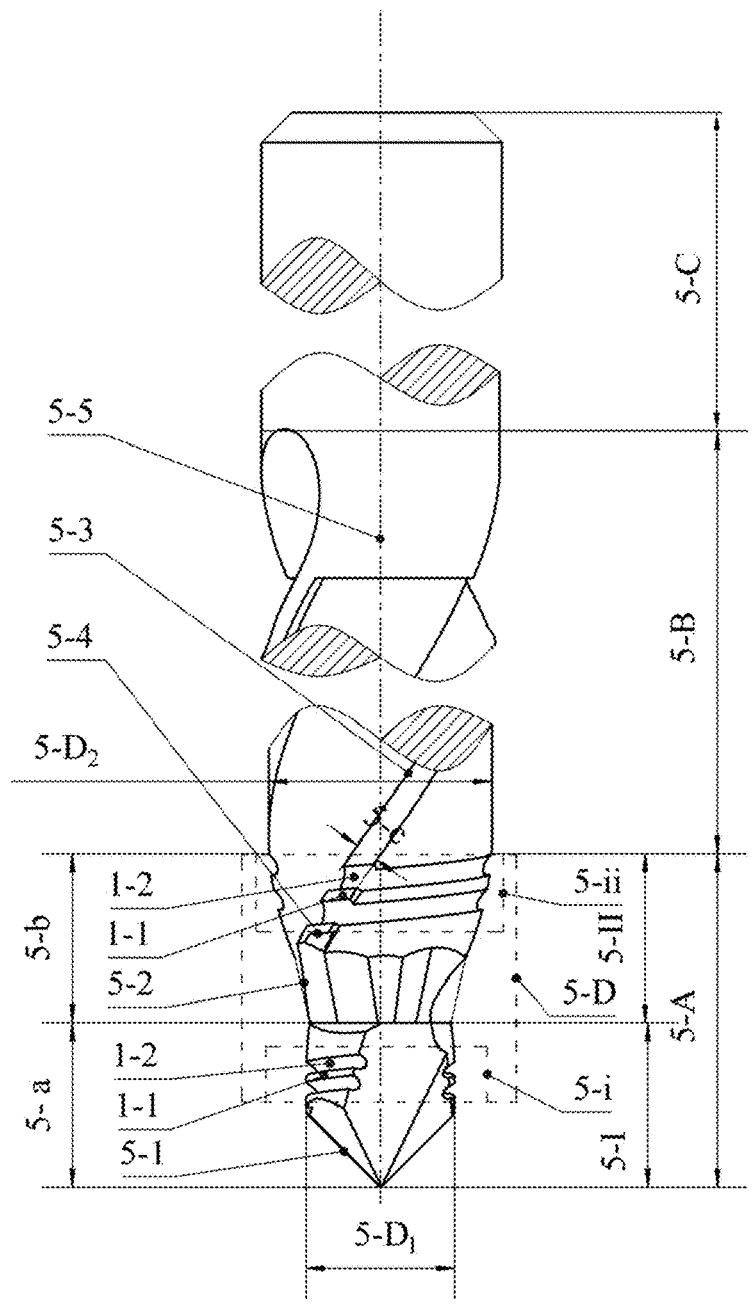
FIG. 7 is the front view of a step drill consisting of a sawtooth structure with reversed cutting function.
Figure 8:
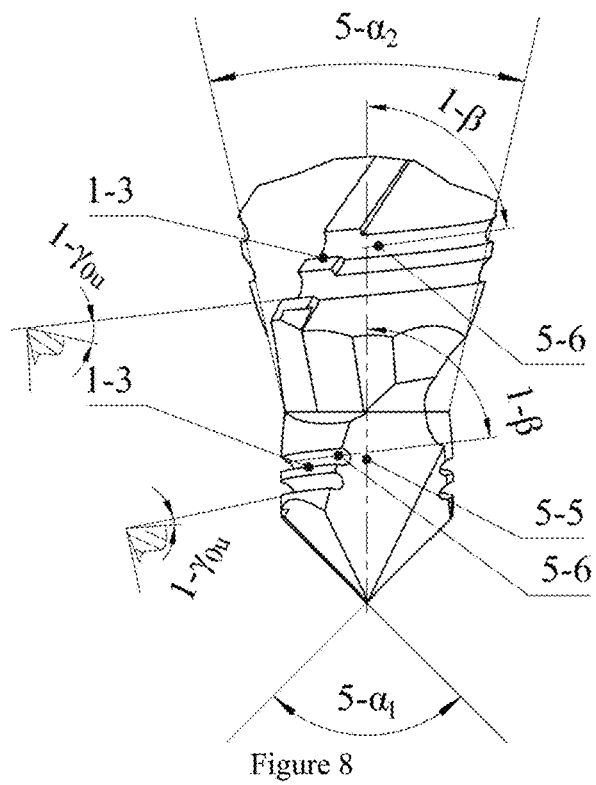
FIG. 8 illustrates the enlarged local view of the step cutting zone 5-A in FIG. 7.

FIGS. 7 and 8 show a right-hand-sawtooth step drill of claims 5, 6 and 7. It can be divided into the step cutting zone 5-A, the minor cutting zone 5-B and the clamping zone 5-C.

Among them, the step cutting zone 5-A consists of two step structures; there are two step structures from the drill tip to the clamping zone 5-C; each step structure is made up of the main step structure 5-I and the minor step structure 5-II.

The drill has the sawtooth cutting zone 5-D, which is located in the step cutting zone 5-A and consists of two sawtooth structures; there are two sawtooth structures from the drill tip to the clamping zone 5-C.

The drilling process can be divided into 10 stages. The first stage is crushing. The chisel edge contacts and crushs the workpiece, and thrust force increase rapidly because of the crushing effect of the chisel edge. The second stage is crushing and drilling. The primary cutting edge 5-1 of the first step structure 5-I cut into and remove the material, and the thrust force increase a little. The third stage is crushing and drilling as well as eliminating burrs by the first sawtooth structure 5-i. The sawteeth start to eliminate burrs. The fourth stage is crushing, drilling, eliminating burrs by the first sawtooth structure 5-i and reaming. The secondary cutting edge 5-2 of the second step structure 5-II cut into the material and begins to remove the material. The thrust force increases a little. The fifth stage is drilling, eliminating burrs by the first sawtooth structure 5-i and reaming. At this time, the chisel edge arrives at the bottom of the workpiece, and the thrust force drops suddenly after the chisel edge penetrates the material. The sixth stage is drilling, eliminating burrs by the first sawtooth structure 5-i, reaming and eliminating burrs by the second sawtooth structure 5-ii. The second sawtooth structure starts to eliminate burrs. The seventh stage is eliminating burrs by the first sawtooth structure 5-i, reaming, eliminating burrs by the second sawtooth structure 5-ii and reaming. At the same time, the primary cutting edge 5-1 of the first step structure 5-I penetrates the workpiece, and the minor cutting edge 5-3 reams the hole, which leads to the further reducing of thrust force. The eighth stage is reaming, eliminating burrs by the second sawtooth structure 5-ii and reaming. The first sawtooth structure leave the hole, and the minor cutting edge 5-3 continues to ream the hole. The ninth stage is eliminating burrs by the second sawtooth structure 5-ii and reaming. The primary cutting edge 5-2 of the second step structure 5-II drills out, and thrust force decreases further; the tenth stage is reaming. The second sawtooth structure 5-ii leaves the workpiece, and the minor cutting edge 5-3 reams the hole.

The drill adopts double-step structure for CFRP, which contributes to reducing thrust force and delamination; the minor cutting edge 5-3 in the first step structure 5-I and the second step structure 5-II is designed with the sawtooth structure, which realizes the rebounding into the sawtooth structure and cutting off for generating burrs in drilling. It can eliminate the burrs effectively at the exit and entrance, and decrease the cracks in the final hole; the minor cutting edge 5-3 adopts right-hand structure, and it contributes to removing burrs; the secondary cutting edges 5-2 in the second step structure 5-II have five flank faces. It will decrease the friction between drill and workpiece, cutting heat and drill wear. Eventually, the workpiece quality is improved; the back-taper structure is used to reduce the vibration of entrance in the final molding stage and enhance the hole diameter precision and entrance quality.

In this embodiment, as shown in FIGS. 7 and 8, the nominal diameter 5-$D_1$ of the first step structure 5-I is 4.94 mm, while the nominal diameter 5-$D_2$ of the second step structure 5-II is 7.94 mm. So the difference of the nominal diameter between the second step structure 5-II and the first step structure 5-I is 0.38 times bigger than that of the second step structure 5-II; the axial length of the first step structure 5-$a$ and the axial length of the second step structure 5-$b$ are both 5.5 mm; the point angle of the first step structure 5-$\alpha_1$ is 90°, while the point angle of the second step structure 5-$\alpha_2$ is 70°; the rake angle of primary cutting edge in each step structures is ground into constant; the width of minor cutting edge 5-3 is 0.8 mm; the margin in the minor cutting edge of the second step structure 5-II near the drill bit is ground into inverted L-shape structure 5-4.

The number of the sawteeth in the sawtooth cutting zone 5-D of the step structure is two and they are identical in each step; the axial distance between the sawtooth on each step structure which is the closest to the drill point and the end of the corresponding primary cutting edge is 1 mm; for the 5-$ii$ sawtooth structure, the sawteeth width is 0.83 mm, and the width of the groove is 0.43 mm. Meanwhile, for the 5-$i$ sawtooth structure, the sawteeth width is 0.5 mm, and the width of the groove is 0.3 mm. Therefore, the sawteeth width ratio of the 5-$i$ sawtooth structure to 5-$ii$ sawtooth structure is 0.6, and the grooves width ratio of the 5-$i$ sawtooth structure to 5-$ii$ sawtooth structure is 0.7; the sawteeth (1-1) and grooves (1-2) have a spiral design along drill axis (5-5). The helix angles of the 5-$i$ sawtooth structure and 5-$ii$ sawtooth structure are both 81°. The bottom edges (1-3) act as the cutting edges which are ground to a positive rake angle (1-$\gamma_{0u}$) with 20°.

INDUSTRIAL APPLICABILITY

The invention is the sawtooth structure with reverse shearing functions and its drill series is particularly suited to low-damage drilling for CFRP. The sawtooth structure consists of several sawteeth and grooves intermittently arranged on the cutting edge; The sawtooth structure has a specific helix angle and can be classified as the left-hand helix sawtooth and right-hand helix sawtooth based on the helix angle value. The bottom edges of the left-hand helix sawtooth are the cutting edges, while the top edges of the right-hand helix sawtooth are the cutting edges. Both of these cutting edges are ground into positive rake angle. The sawtooth structure has advantages of high universality which make it possible to be applied to various kinds of drills. It has the significant effects on suppressing the exit and entrance damage. The sawtooth structure is applied to the cutting edge of the double point angle drill, the twist drill and the step drill, which form the drill series with sawtooth structure. The drill series can realize low-damage drilling for fiber reinforced composites, significantly improve the drill cutting ability and service life and reduce cost.

We claim:

1. A sawtooth structure with reversed cutting function has characteristics as below: the sawtooth structure is constructed by sawteeth (1-1) and grooves (1-2) located on cutting edges of a drill; the sawteeth (1-1) and the grooves (1-2) are helically arranged around a drill axis; the sawtooth structure is classified as left-hand helix sawtooth structure and right-hand helix sawtooth structure based on a helix angle (1-$\beta$) of the sawtooth structure; the sawteeth (1-1) with the helix angle (1-$\beta$) larger than 60° and smaller than 90° _are categorized as right-hand sawteeth, and top edges (1-3) of the right-hand sawteeth are additional cutting edges that are ground into positive rake angles (1-$\gamma 0u$); the sawteeth (1-1) with the helix angle (1-$\beta$) smaller than 150° and no less than 90° are categorized as left-hand sawteeth, and bottom edges (1-4) of the left-hand sawteeth are additional cutting edges that are ground into positive rake angles (1-$\gamma 0d$); the sawtooth structure is located on cutting edges of which diameters are equal to 0.6 to 1 time of the diameter of a drill, and for step a drilling structure, the sawtooth structure is located on a step minor cutting edge; a length of sawteeth (1-Lt) is not larger than the length of a drilling margin and is at least 0.8 mm; a width of grooves (1-Wg) is at least 0.3 mm; a width of sawteeth (1-Wt) is at least 0.5 mm; a depth of grooves (1-Dt) is at least 0.8 mm, and the sawteeth (1-1) at a minimum diameter position cannot interfere with a drilling core.

2. The sawtooth structure with reversed cutting function according to claim 1, wherein an intersecting-sawtooth double point angle drill consisting of the sawtooth structure with reversed cutting function, the right-hand and left-hand helix sawtooth structures are under intersecting arrangement; the right-hand and left-hand sawteeth are located on the cutting edges of the intersecting-sawtooth double point angle drill with four flutes; a intersecting sawtooth cutting zone (2-E) is arranged at ends of four secondary cutting edges (2-2) within a secondary cutting zone (2-B) and at fronts of four minor cutting edges (2-3) within a minor cutting zone (2-C); the intersecting sawtooth cutting zone (2-E) is constructed by the sawtooth structure arranged on separate cutting edges; the profiles of sawteeth (1-1) and grooves (1-2) remain the same on one cutting edge-; the number of sawteeth (1-1) along one cutting edge is 3-7, and the number is identical on all cutting edges; helix angles of sawteeth (1-1) and grooves (1-2) are different on two adjacent cutting edges while the helix angles of sawteeth (1-1) and grooves (1-2) are identical on two opposite cutting edges; a helix angle (2-βR) of sawteeth (1-1) on one set of cutting edges is right-hand acute angle larger than 60°, and top edges (1-3) are additional cutting edges which are ground into positive rake angles (1-γ0u); a helix angle (2-βL) of sawteeth (1-1) on another set of cutting edges is right angle or left-hand obtuse angle less than 150°, and the bottom edges (1-4) are additional cutting edges which are ground into positive rake angles (1-γ0d); the above stated right-hand and left-hand sawteeth form the intersecting sawtooth cutting zone (2-E) on two adjacent cutting edges.

3. The sawtooth structure with reversed cutting function according to claim 1, wherein a right-hand sawtooth double point angle drill consisting of the sawtooth structure with reversed cutting function, the right-hand sawteeth are helically arranged on the cutting edges of the right-hand sawtooth double point angle drill with four flutes, and a sawtooth cutting zone (3-E) is arranged at fronts of four secondary cutting edges wherein a secondary cutting zone (3-B) and ends of four minor cutting edges at a minor cutting zone (3-C); the sawtooth cutting zone (3-E) is constructed by the sawtooth structure located on separate cutting edges; the number of sawteeth (1-1) on each secondary cutting edge is 1 to 3 and the number of sawteeth (1-1) on each minor cutting edge is 2 to 4; a helix angle (1-β) of the sawtooth structure of all the sawteeth (1-1) is right-hand acute angle larger than 60° and top edges (1-3) on the sawteeth (1-1) are additional cutting edges that are ground into positive rake angles (1-γ0u).

4. The sawtooth structure with reversed cutting function according to claim 1, wherein a right-hand sawtooth twist drill consisting of a sawtooth structure with reversed cutting function, the right-hand sawteeth are arranged on minor cutting edges; a point angle (4-α) of the right-hand sawtooth twist drill is 85°-90°, and the length of a chisel edge is 0.1-0.6 mm, a rake angle (4-γ0) of primary cutting edges (4-1) of the right-hand sawtooth twist drill is ground into fixed value and the rake angle (4-γ0) is 15°-20°, a first flank angle (4-α1) on the primary cutting edges (4-1) is 10°-12° and a second flank angle (4-α2) on the primary cutting edges (4-1) is 15°-25°, the area of a second flank face (4-8) is 3 to 5 times larger than the area of a first flank face (4-7); a helix angle of the flutes of the right-hand sawtooth twist drill is 30°-34°; a sawtooth cutting zone (4-D) is located on minor cutting edges (4-2) of the right-hand sawtooth twist drill within a minor cutting zone (4-B); the number of sawteeth (1-1) on each minor cutting edge (4-2) is 3-5 and the number is identical on all the minor cutting edges (4-2); a distance (4-d) between the sawteeth close to a drill point and a primary cutting zone (4-A) is 1-1.5 mm; the sawteeth (1-1) and the grooves (1-2) are helically arranged around a drill axis (4-4) and the helix angle (1-β) of the sawtooth structure is acute angle larger than 60°; the top edges (1-3) of the sawteeth (1-1) are additional cutting edges that are ground into positive rake angles (1-γ0u).

5. The sawtooth structure with reversed cutting function according to claim 1, wherein a right-hand sawtooth step drill consisting of the sawtooth structure with reversed cutting function, the right-hand sawteeth are arranged on step minor cutting edge of the right-hand sawtooth step drill; a step cutting zone (5-A) is constructed by n levels of step structures, wherein n is a number ≥2; each step structure is comprised of a primary step cutting zone and a minor step cutting zone; a Level j step structure is a part of the n levels of step structures; a sawtooth cutting zone (5-D) is located on the step cutting zone (5-A) and the sawtooth cutting zone (5-D) is constructed by n levels of sawtooth structure; then levels of sawtooth structures are arranged in the direction from a drill point to a clamping zone (5-C); a Level j sawtooth structure is a part of the n levels of sawtooth structures and is located on a minor cutting zone of the Level j step structure, wherein j is a number ≥n.

6. The sawtooth structure with reversed cutting function according to claim 5, wherein a nominal diameter difference between Level j and Level j−1 step structures is 20% to 40% of a nominal diameter of the Level j step structure, where 2≤j≤n; at least two sawteeth (1-1) are distributed along an axial direction of a step minor cutting edge of the Level j step structure for the right-hand sawtooth step drill, wherein j is a number >2; a point angle of the Level j step structure is 80°-100°, wherein j=1; a point angle of the Level j step structure is 60°-80°, and the point angle of the Level j step structure is smaller than that of a Level j−1 step structure, wherein j is a number ≥2; a rake angle of primary cutting edges of each step structure is ground into a fixed value; the length of a margin on each minor cutting edge is 0.5-1.5 mm; the margin on each minor cutting edge is ground into an inverted L-shape structure (5-4).

7. The sawtooth structure with reversed cutting function according to claim 6, wherein the number of sawteeth within the sawtooth cutting zone (5-D) of each step structure is 2-4; on each step structure, an axial distance between the sawteeth (1-1) close to the drill point and an end of a primary cutting edge is 1-1.5 mm; the ratio between the widths of the grooves (1-2) on Level j−1 and Level j sawtooth structures is 0.6-0.8, where 1≤j≤n; the width ratio between sawteeth (1-1) on Level j−1 and Level j sawtooth structures is 0.5-0.7; the width of sawteeth (1-1) on Level 1 is at least 0.5 mm, and the width of grooves (1-2) is at least 0.3 mm; the sawteeth (1-1) and the grooves (1-2) are helically arranged around a drill axis (5-5), and the helix angle of the sawteeth (1-1) is an acute angle and larger than 60°; bottom edges (1-4) of the sawteeth (1-1) are additional cutting edges, and the rake angle of the additional cutting edges is ground into a positive angle (1-γ0u).

8. The sawtooth structure with reversed cutting function according to claim 5, wherein the number of sawteeth within the sawtooth cutting zone (5-D) of each step structure is 2-4; on each step structure, an axial distance between the sawteeth (1-1) close to the drill point and an end of a primary cutting edge is 1-1.5 mm; the ratio between the widths of the grooves (1-2) on Level j−1 and Level j sawtooth structures is 0.6-0.8, where 1≤j≤n; the width ratio between sawteeth (1-1) on Level j−1 and Level j sawtooth structures is 0.5-0.7; the width of sawteeth (1-1) on Level 1 is at least 0.5 mm, and the width of grooves (1-2) is at least 0.3 mm; the sawteeth (1-1) and the grooves (1-2) are helically arranged around a drill axis (5-5), and the helix angle of the sawteeth (1-1) is an acute angle and larger than 60°; bottom edges (1-4) of the sawteeth (1-1) are additional cutting edges, and the rake angle of the additional cutting edges is ground into a positive angle (1-γ0$u$).

* * * * *